United States Patent [19]
Reed, Jr. et al.

[11] Patent Number: 5,489,011
[45] Date of Patent: Feb. 6, 1996

[54] VEHICLE CLUTCH CABLE SELF-ADJUSTING MECHANISM

[75] Inventors: Richard G. Reed, Jr., Royal Oak; John J. Opra, Farmington Hills, both of Mich.

[73] Assignee: Chrysler Corporation, Highland Park, Mich.

[21] Appl. No.: 254,622

[22] Filed: Jun. 6, 1994

[51] Int. Cl.⁶ ..................................................... F16D 13/75
[52] U.S. Cl. .................... 192/111 A; 74/501.5 R
[58] Field of Search ........................... 74/501.5 R, 502.6; 192/111 A

[56] References Cited

U.S. PATENT DOCUMENTS

| | | | |
|---|---|---|---|
| 3,036,350 | 5/1962 | Hunt | 24/123 |
| 3,546,962 | 12/1970 | Ruhala | 74/501 |
| 4,068,750 | 1/1978 | Gatewood | 192/111 A |
| 4,331,041 | 5/1982 | Bennet | 74/501.5 R |
| 4,378,713 | 4/1983 | Haskell et al. | 74/501.5 R |
| 4,424,890 | 1/1984 | Duethman | 192/111 A |
| 4,464,950 | 8/1984 | Deligny | 74/501.5 R |
| 4,598,809 | 7/1986 | Glover et al. | 192/111 A |
| 4,610,180 | 9/1986 | Spease | 74/501 P |
| 4,658,668 | 4/1987 | Stocker | 74/501.5 R |
| 4,669,330 | 6/1987 | Stocker | 74/501.5 R |
| 4,682,760 | 7/1987 | Baumgarten | 254/199 |
| 4,694,706 | 9/1987 | Lichtenberg et al. | 74/501.5 R |
| 4,756,397 | 7/1988 | Deligny | 192/111 A |
| 4,762,017 | 8/1988 | Jaksic | 74/501 R |
| 4,787,263 | 11/1988 | Jaksic | 74/501.5 R |
| 4,798,100 | 1/1989 | Baumgarten | 74/501.5 R |
| 4,799,400 | 1/1989 | Pickell | 74/502.6 |
| 4,833,937 | 5/1989 | Nagano | 74/501.5 R |
| 4,838,109 | 6/1989 | Stewart | 74/501.5 R |
| 4,841,805 | 6/1989 | Italiano | 74/501.5 R |
| 4,854,185 | 8/1989 | Lichtenberg et al. | 74/501.5 R |
| 4,854,186 | 8/1989 | Jakob et al. | 74/501.5 R |
| 4,869,123 | 9/1989 | Stocker | 74/501.5 R |
| 4,895,041 | 1/1990 | Cunningham | 74/502.4 |
| 4,955,252 | 9/1990 | Clissett et al. | 74/501.5 R X |
| 5,138,897 | 8/1992 | Beard et al. | 74/501.5 R |

FOREIGN PATENT DOCUMENTS 2176861  1/1987  United Kingdom ............... 192/111 A

*Primary Examiner*—Rodney H. Bonck
*Attorney, Agent, or Firm*—Christopher A. Taravella

[57] ABSTRACT

An improvement to a self-adjusting clutch cable mechanism for adjusting a conduit relative to the strand slidably mounted therethrough. The improved mechanism features a spacer element operatively connected between the clutch pedal arm and the strand, wherein the spacer engages an adjustment sleeve member extending beyond a fixed cylindrical sleeve. Moving the sleeve member through the distance to the end of the cylindrical sleeve serves to free the conduit for repositioning relative to the strand upon release of the clutch pedal, and also provides a stop for the pedal in the free clutch pedal "up" position.

8 Claims, 4 Drawing Sheets

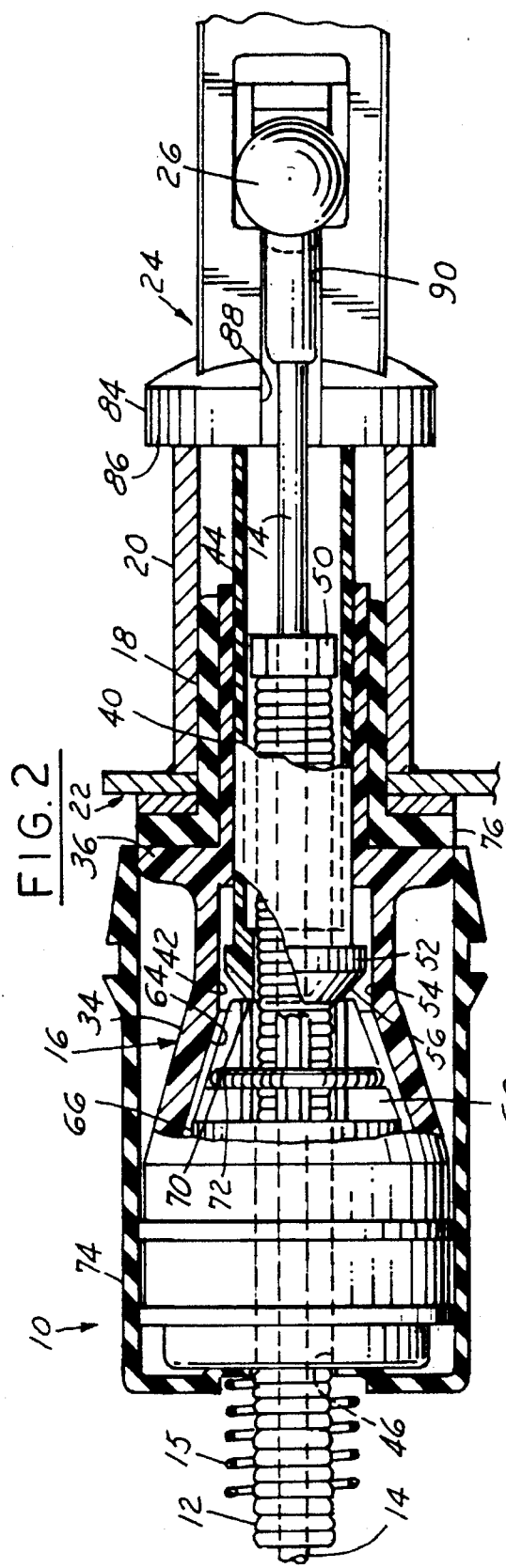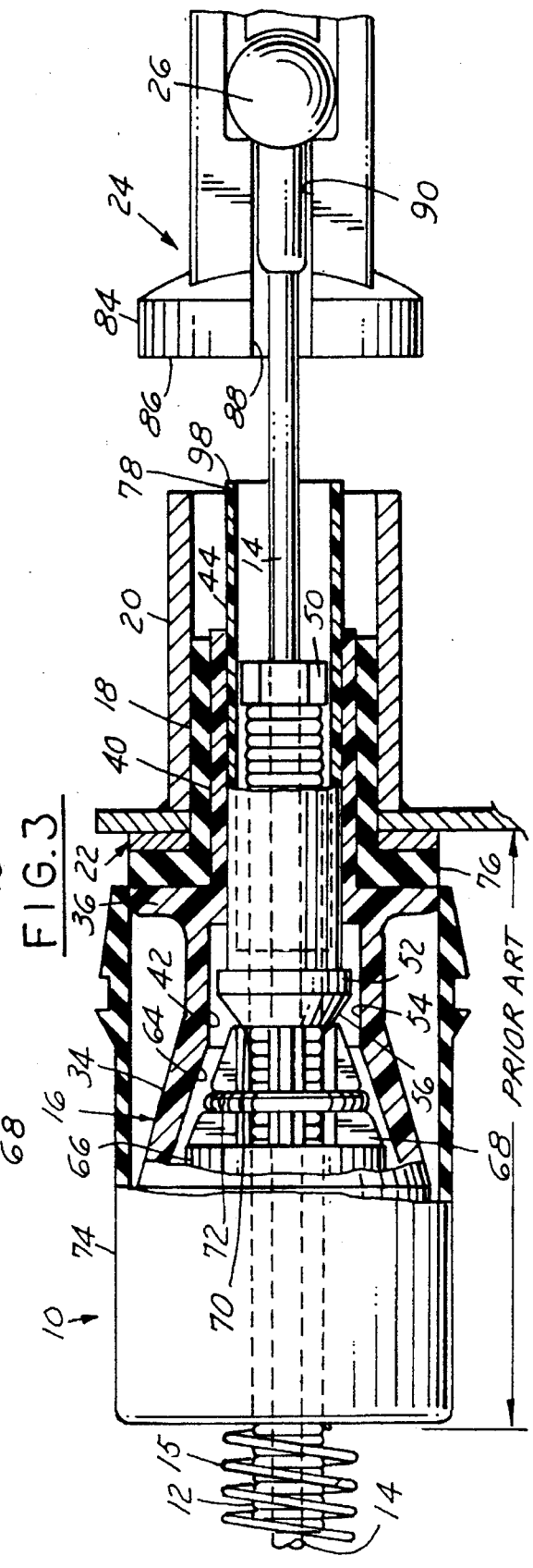

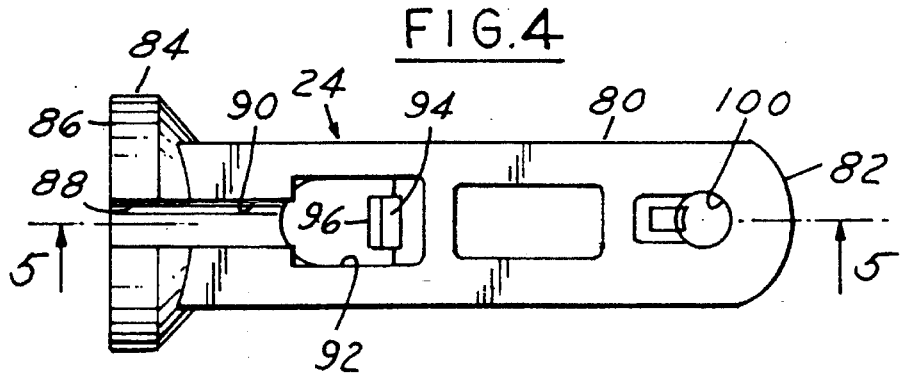
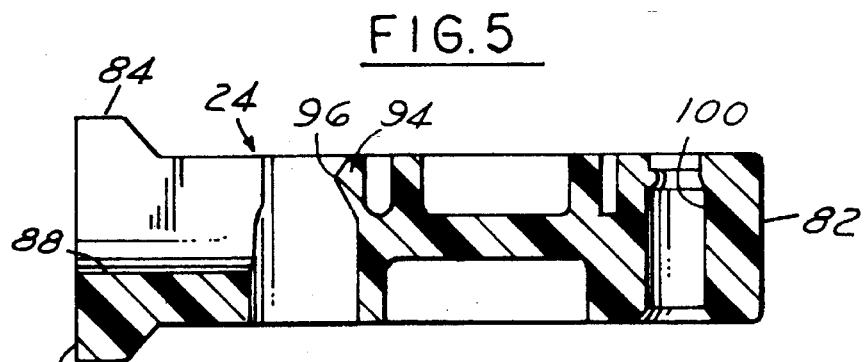
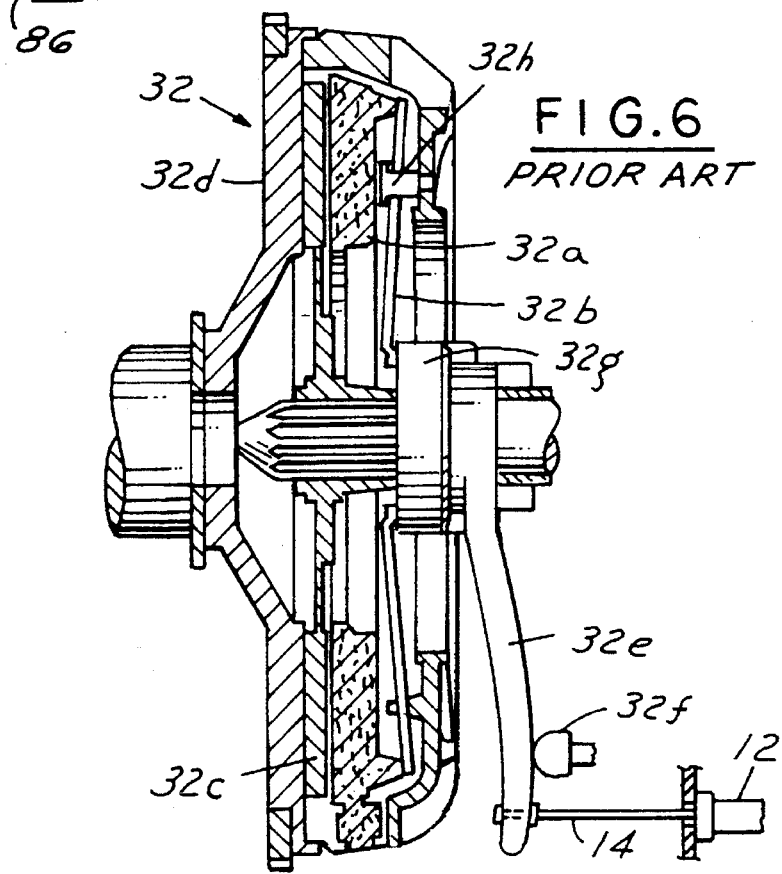

5,489,011

1

VEHICLE CLUTCH CABLE SELF-ADJUSTING MECHANISM

FIELD OF THE INVENTION

This invention relates generally to cable adjustment mechanisms and, more particularly, to a self-adjusting mechanism for a vehicle clutch cable.

BACKGROUND ART

Various satisfactory self-adjusting clutch cable control apparati are known. For example, Guidicelli U.S. Pat. No. 4,793,205 discloses such an apparatus wherein a tubular spacer member is dimensioned such that, in the rest position, a transverse coupling member is spaced from a bearing surface of a saddle having a U-shaped slot in register with a U-shaped aperture of the clutch pedal by a gap, to thereby permit independent setting of the limit positions of the pedal and the clutch to be actuated.

Pickell U.S. Pat. No. 4,799,400 discloses a self-adjusting cable control device including components having complimentary conical surfaces and serrations for engaging and disengaging, with associated spring means for establishing the adjustment therebetween.

Glover et al U.S. Pat. No. 4,598,809 discloses a cable and sleeve connector including a first sleeve that is externally serrated and mounted around a control cable extending to a clutch pedal, an opening that is tapered to serve as a wedge for collet members having internal serrations for meshing with the external serrations, a spring-loaded tubular member, and a second sleeve connected to the cable between the tubular member and the clutch pedal for engaging the tubular member and forcing it into the collet members to spread same away from the first sleeve to thereby permit adjustment around the first sleeve relative to the internal cable.

Acco European Cable Controls Group, a subsidiary of Babcock International Plc. manufacture and sell "Auto-Adjust" clutch cable assemblies including separate mechanisms for releasing a conduit gripping unit and for stopping the clutch pedal in its released position.

Other cable adjusting devices are shown and described in U.S. Pat. Nos. 4,895,041; 4,869,123; 4,854,186; 4,854,185; 4,841,805; 4,838,109; 4,833,937; 4,798,100; 4,787,263; 4,762,017; 4,694,706; 4,682,760; 4,669,330; 4,658,668; 4,610,180; 4,464,950; 4,424,890; 4,378,713; 4,331,041; 3,546,962; and 3,036,350.

DISCLOSLURE OF THE INVENTION

A general object of the invention is to provide an improved self-adjusting clutch cable mechanism.

Another object of the invention is to provide a self-adjusting clutch cable mechanism which substantially reduces pedal free-play at the top of the clutch pedal travel.

Still another object of the invention is to provide a mechanism to actuate self-adjusting clutch cable mechanism for adjusting a conduit relative to the strand therein, and including a spacer element operatively connected between the clutch pedal arm and the strand which releases a spring-biased adjustment sleeve to allow adjustment of the conduit upon depression of the clutch pedal, and engages the adjustment sleeve to free the conduit for repositioning relative to the strand upon release of the clutch pedal.

2

A further object of the invention is to provide a common feature to be used as a stop for the pedal spacer element in the clutch pedal up position and provide for mounting of the adjuster mechanism.

These and other objects and advantages of the invention will become more apparent when reference is made to the following drawings and the accompanying description.

BRIEF DESCRIPTION OF THE DRAWINGS

FIG. 2 is an enlarged cross-sectional view of the self-adjusting mechanism of the FIG. 1 clutch system;

FIG. 3 is a view showing the self-adjusting mechanism of FIG. 2 in a different operational position;

FIG. 4 is an enlarged top view of an actuating spacer component of the FIG. 1 clutch system;

FIG. 5 is a cross-sectional view taken along the plane of the line 5—5 of FIG. 4, and looking in the direction of the arrows;

FIG. 6 is a cross-sectional view of a prior art push style clutch;

BEST MODE OF CARRYING OUT THE INVENTION

Figure 1:
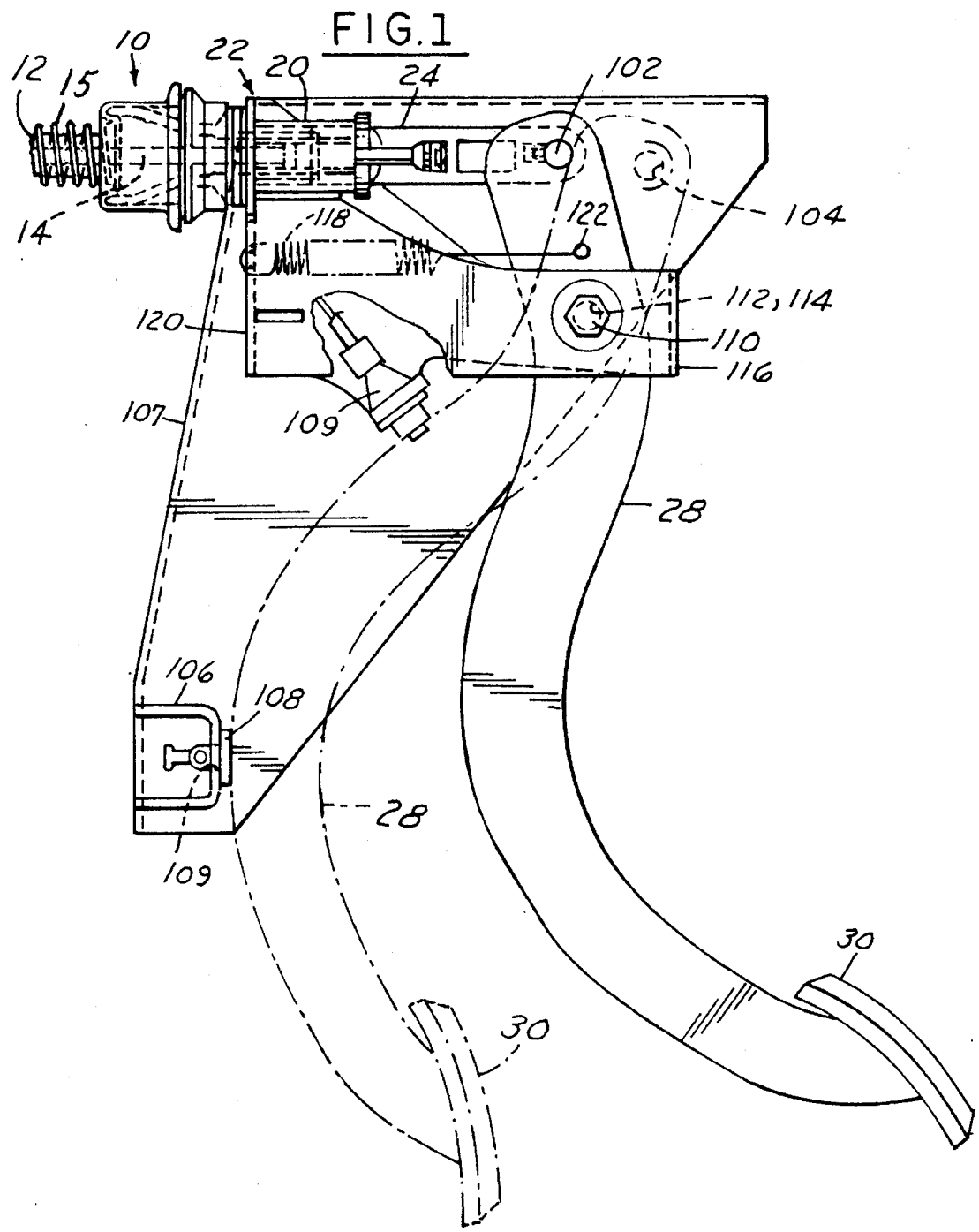
FIG. 1 is a side elevational view of a vehicle clutch system embodying the invention.
Figure 1A:
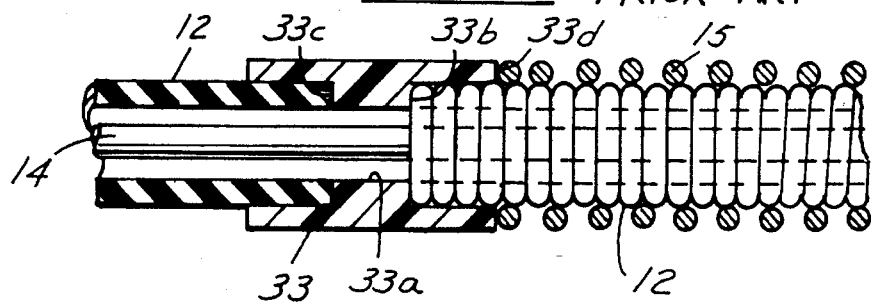
FIG. 1A is an enlarged, fragmentary cross-sectional view illustrating the interconnection of the conduit and its tensioning spring, around an internal strand.

Referring now to the drawings in greater detail, FIG. 1 illustrates, generally, a cable adjusting apparatus 10 including a cable comprising an outer conduit 12 and an inner slidably mounted strand 14, a conduit tensioning spring 15, an adjustment mechanism 16 secured to one end of the conduit 12 and having an end portion 18 thereof mounted in a cylindrical sleeve 20 formed on a clutch pedal bracket 22 and adapted to alternately become engaged around and released from the conduit 12, an adjustment take-up spacer and actuating device 24 secured between a spherical end 26 of the strand 14 and an end of a clutch pedal arm 28 extending from a clutch pedal 30, with the other ends of the conduit 12 and strand 14 operatively connected to a typical clutch mechanism 32 (Prior art FIG. 6), to disengage same in response to actuation of the clutch pedal 30 by the vehicle operator in the usual manner. As shown in FIG. 1A, the conduit 12 changes from a metal segment extending into the cable adjusting apparatus 10, to a rubber sheath segment extending to the clutch 32. Specifically, a sleeve 33, having a small diameter center portion 33a, providing annular shoulders 33b and 33c, is squeezed around the adjacent ends of the metal and sheath segments of the conduit 12 abutted against the respective shoulders 33b and 33c. The conduit tensioning spring 15 is confined between an end face 33d of the sleeve 33 and an end of the cable adjusting apparatus 10.

As the usual clutch plate, represented as 32a in FIG. 6, within the clutch mechanism 32 becomes worn and, hence, thinner, and is urged by a diaphragm spring 32b therein into engagement with a disc 32c adjacent a flywheel 32d, in response to actuation of the strand 14, it is essential that an adjustment be automatically made between the relative positions of the conduit 12 and the strand 14, as will be hereinafter explained. The strand 14 is secured in a suitable manner to the distal end of a release lever 32e, which is pivotable about a pivot stud 32f. The release lever 32e is secured at the inner end to a release bearing 32g to which the diaphragm spring 32b is secured. The spring 32b is pivotable at an intermediate point therealong about an annular pivot 32h.

More specifically, the adjustment mechanism 16 illustrated in FIGS. 2 and 3 is manufactured by Acco European Cable Controls Group, a subsidiary of Babcock International Plc., and includes a housing 34 having a central flange 36, a cylindrical extension 40 around which the end portion 18 is mounted, and an axial passageway 42 formed therethrough. A sleeve member 44 is slidably mounted within the cylindrical extension 40 so as to extend beyond both ends of the latter. The conduit 12 and strand 14 are extended into the housing 34 through one end 46 of the passageway 42, with the conduit 12 terminating within the sleeve member 44 at a mid-point thereof, and the strand 14 extending beyond the outer edge of the sleeve member 44. A crimp ring 50, secured to the end of the conduit 12, is slidably mounted within the surrounding surface of the sleeve member 44.

A flange 52 is formed on the end of the sleeve member 44 within an annular recess 54 formed in the inner surface of the housing 34. A chamfered edge portion 56 is formed on the flange 52 away from the sleeve member 44. A frusto-conical surface 64 is formed in the housing 34, extending from the end of the annular recess 54.

An adjustment member 66 having four spaced-apart legs 68 is movably mounted in the housing 34 such that the legs extend through the frusto-conical surface 64 to abut against the face 70 of the chamfered edge portion 56. An endless coil spring ring 72 is mounted around the legs 68, urging the legs into gripping engagement with the conduit 12.

A new feature is the mounting of the end portion 18 of the adjustment mechanism 16 within the cylindrical sleeve 20 on the clutch pedal bracket 22, wherein the critical dimensions are the length of the cylindrical sleeve 20 of the clutch pedal bracket 22 and the overall length of a cylindrical body 74 extending from a flange 76 of the end portion 18, plus an extended edge portion 78 (FIG. 3) of the sleeve member 44 beyond the end of the cylindrical sleeve 20 with the sleeve member 44 in its freely extended position. As such, the sleeve member 44 extends a predetermined distance beyond the edge of the cylindrical sleeve 20, for a purpose to be described.

As better shown in FIGS. 4 and 5, the adjustment take-up spacer and actuating device 24 comprises a body 80 formed to include one arcuate-shaped end 82 and an enlarged end 84 having a flat end face 86 with a central opening 88 formed therein. A slot 90 is formed in a side of the body 80 from the end face 86 of the enlarged end 84, radially inwardly to the central opening 88 and longitudinally for a predetermined length, terminating in a wide recess 92. A flexible lug 94 having a V-shaped edge 96 pointing toward the enlarged end 84 is molded in the recess 92. As such, the spherical end 26 of the strand 14 is snapped past the V-shaped edge 96 of the flexible lug 94 into the recess 92, with the adjacent end portion of the strand 14 entering through the slot 90 into the central opening 88. The flat end face 86 is abutted against the face 98 of the extended edge portion 78 of the sleeve member 44.

An opening 100 (FIGS. 4 and 5) is formed laterally through the body 80 adjacent the arcuate-shaped end 82. A fastener 102 (FIG. 1) is extended through an opening 104 in the end of the clutch pedal arm 28 and the opening 100 to pivotally connect the pedal arm 28 to the body 80.

An abutment bracket 106 (FIG. 1) is integrally formed on a lower extension 107 of the clutch pedal bracket 22. A rubber bumper 108 is mounted in an opening 109 formed in the abutment bracket 106 to establish the limit of movement of the arm 28 and the clutch pedal 30 in its depressed modes of operation. A clutch pedal position switch is mounted on the lower extension 107, adapted to being engaged by the depressed pedal 30. A pivot type fastener 110 is mounted through an opening 112 formed through the arm 28 and aligned openings 114 formed in parallel braces 116 of the bracket 22. A spring 118 is connected between a wall 120 of the bracket 22 and an opening 122 formed in the arm 28 between the pivot pin 110 and the distal end of the arm.

Figure 8:
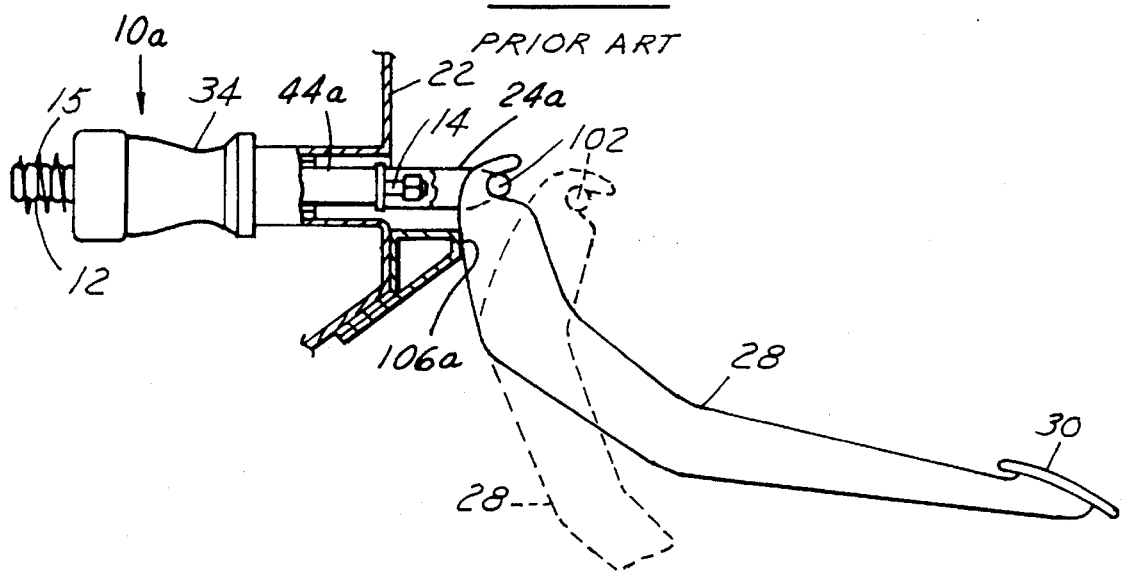
FIG. 8 is a side elevational view of a prior art clutch cable self-adjusting mechanism.

Referring now to the prior art structure of FIG. 8, a clutch pedal 30 is operatively connected to a cable adjusting apparatus 10a via a spacer 24a. The latter is adapted to abut against an end of a sleeve member 44a apart from any surrounding structure. A fixed abutment bracket 106a serves as a stop when the pedal 30a is retracted into its free "up" position.

In operation, each time the vehicle operator depresses the clutch pedal 30 (shown in phantom in FIG. 1) to pull on the strand 14 and thus release the clutch disc 32c (FIG. 6), such action pivots the arm 28 about the pivot pin 110 against the force of the spring 118, until the clutch pedal arm 28 engages the rubber bumper 108, and pulls the adjustment take-up spacer and actuating device 24 and the strand 14 rightwardly in FIG. 3. This action frees the flat end face 86 from the edge of the cylindrical sleeve 20 of the bracket 22. Once freed, the coil spring ring 72 forces the four spaced-apart legs 68 radially inwardly to thereby circumferentially engage the conduit 12.

Figure 7:
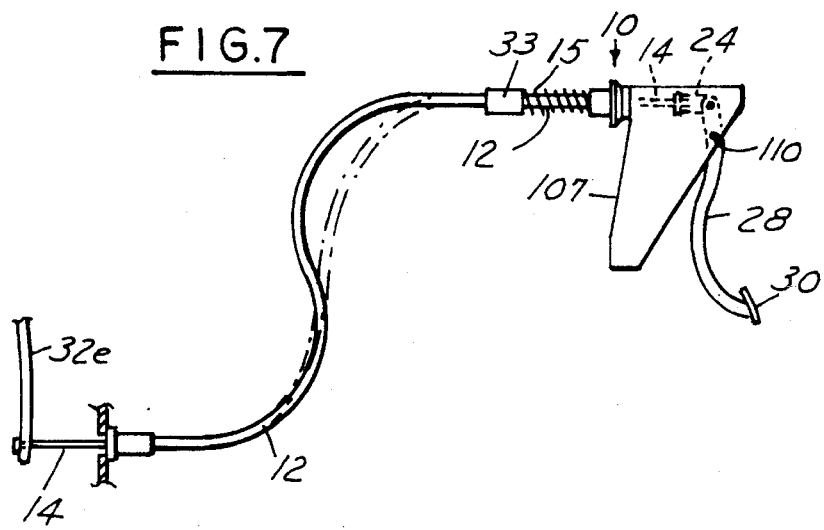
FIG. 7 is a sketch illustrating an operational characteristic of the invention.

When the clutch pedal 30 is released (shown in solid lines in FIG. 1), to engage the clutch disc 32c via the movement of the strand 14, the spring 118 pulls the arm 28 in a counterclockwise direction, in FIG. 1, about the pivot pin 110, once again forcing the adjustment take-up spacer and actuating device 24 leftwardly such that the flat end face 86 engages the extended end of the sleeve member 44, forcing the latter into the adjustment mechanism 16 until the flat end face 86 engages the edge of the cylindrical sleeve 20, serving as a stop. This movement of the sleeve member 44 forces the chamfered edge portion 56 into the four spaced-apart legs 68, urging them radially outwardly and, hence, further apart against the force of the coil spring ring 72. As such, the legs 68 become disengaged from the conduit 12. With the legs 68 disengaged from the conduit 12, the conduit tensioning spring 15, positioned between the movable sleeve 33 (FIG. 1A) and the fixed end of the cylindrical body 74 (FIG. 2), is free to adjust the conduit 12 length to compensate for the effective longer length of the strand 14 due to the reduced thickness of the clutch disc 32c (FIG. 6) due to wear. Specifically, referring to FIG. 7, as the strand 14 moves to the left in FIG. 7 due to the clutch disc 32c wear, the strand will cause the conduit 12 to assume a shallower "S" configuration, as indicated by the phantom line, with the conduit metal segment free to adjust to the right in FIG. 2 within the sleeve member 44. The conduit tensioning spring 15 maintains a predetermined tension within the system.

INDUSTRIAL APPLICABILITY

It should be apparent that the invention provides an improved clutch cable self-adjusting mechanism wherein the cable conduit is readily and accurately adjusted relative to the strand therein, with pedal free play substantially reduced, in response to the actual change in the clutch unit due to clutch disc wear.

As compared to the prior art arrangement of FIG. 8, wherein there may result a significant amount of tolerance accumulation, it should be further apparent that the dimensional control resulting from the cylindrical sleeve 20 being a stop for the actuating device 24 and the clutch pedal 30 up-stop position provides tighter tolerances.

While but one embodiment of the invention has been shown and described, other modifications are possible within the scope of the following claims.

What is claimed is:

1. A self-adjusting mechanism for a vehicle including a clutch cable including a conduit with a strand slidably mounted therethrough, a clutch including a clutch disc subject to wear, said strand being connected to said clutch for effecting the engagement and disengagement of said clutch disc, and a clutch pedal, the mechanism including a housing having a two-diameter axial passageway formed therethrough with an interconnecting frusto-conical section, a sleeve member slidably mounted in the smaller diameter passageway and extending beyond the opposite ends thereof, an adjustment member including a body slidably mounted in the larger diameter passageway, four spaced-apart legs extending from the body into the frusto-conical section, a resilient compression ring mounted around the four legs, a chamfered end formed on the sleeve member, the conduit extending through the larger diameter passageway and the frusto-conical section and into the sleeve member, with the end of the conduit being slidably mounted within the sleeve member, and said strand extending beyond the end of said sleeve member, the improvement comprising a fixed cylindrical sleeve, said housing having an end portion secured in said fixed cylindrical sleeve, said sleeve member extending a predetermined distance beyond the end of said fixed cylindrical sleeve when said clutch pedal is depressed, an actuator secured between said extended strand and said clutch pedal for urging said sleeve member through said predetermined distance to cause said sleeve member to abut against the edge of said fixed cylindrical sleeve when said clutch pedal is released to thereby move said chamfered end into said four spaced-apart legs against the force of said compression ring to reposition said legs on said conduit upon release of said sleeve member to compensate for any clutch disc wear.

2. The improvement described in claim 1, wherein said actuator includes a spacer having the end of said strand secured thereto and an end face adapted to abut against said edge of said fixed cylindrical sleeve, and said clutch pedal being connected to the other end of said spacer for retaining said end face against said edge when said clutch pedal is released and for releasing said end face from said edge when said clutch pedal is depressed.

3. The improvement described in claim 2, wherein said spacer includes a body having said end face formed on one end thereof, a central opening formed in said end face for a predetermined depth, a slot formed in one side radially inwardly to said central opening, and a wide recess formed at the inner end of said central opening and said slot, and spherical end formed on the end of said strand and mounted in said wide recess.

4. The improvement described in claim 3, and a flexible lug having an enlarged distal end for retaining said spherical end in said wide recess after said spherical end is snapped inwardly therepast.

5. The improvement described in claim 2, and a fixed clutch pedal bracket having said clutch pedal pivotally mounted thereon, and an abutment formed thereon for stopping the depression of said clutch pedal.

6. The improvement described in claim 1, and a fixed clutch pedal bracket having said cylindrical sleeve formed thereon, and said end portion of said housing mounted therein.

7. The improvement described in claim 1, and a conduit tensioning coil spring mounted between said housing and a point on said conduit for maintaining a predetermined tension on the conduit.

8. A vehicle clutch cable self-adjusting mechanism and a cable conduit connected between a clutch housing and a sleeve member slidably mounted within the self-adjusting mechanism, and a strand operatively connected through the conduit between a clutch disc movable within the clutch housing and a clutch pedal arm connected to a clutch pedal, a spring-loaded gripping unit within the self-adjusting mechanism adjacent an end of the sleeve member for gripping the conduit upon being released by the sleeve member, the improvement comprising a fixed cylindrical sleeve having said self-adjusting mechanism secured therein, with the outer end of said sleeve member extending a predetermined distance beyond the fixed cylindrical sleeve, a spacer member connected between an end of the strand and an end of the clutch pedal arm and adapted to contact the outer end of the sleeve member and to move it through said predetermined distance with said fixed cylindrical sleeve serving as a stop for said spacer member, and thereby urging said gripping unit away from the conduit upon release of the clutch pedal, and to separate from the sleeve member to thus release the sleeve member from the spring-loaded gripping unit so as to permit the gripping unit to grip the conduit upon depression of the clutch pedal.

* * * * *